United States Patent [19]

Efinger et al.

[11] 4,420,661

[45] Dec. 13, 1983

[54] SWITCHING MECHANISM WITH A VACUUM CIRCUIT BREAKER BETWEEN A BUS BAR AND A CABLE CONNECTION PIECE

[75] Inventors: Arnold Efinger, Trossingen; Erwin Moser, Karlsruhe-Rüppurr, both of Fed. Rep. of Germany

[73] Assignee: Wickmann-Werke Böblingen GmbH, Böblingen, Fed. Rep. of Germany

[21] Appl. No.: 363,508

[22] Filed: Mar. 30, 1982

[30] Foreign Application Priority Data

Mar. 31, 1981 [DE] Fed. Rep. of Germany ....... 3112776

[51] Int. Cl.³ ............................................ H01H 33/66
[52] U.S. Cl. ................................................ 200/144 B
[58] Field of Search ..................................... 200/144 B

[56] References Cited

U.S. PATENT DOCUMENTS

| | | | |
|---|---|---|---|
| 3,956,721 | 5/1976 | Link | 200/144 B |
| 4,150,270 | 4/1979 | Zunick | 200/144 B |
| 4,256,938 | 3/1981 | Efinger et al. | 200/144 B |

*Primary Examiner*—Robert S. Macon
*Attorney, Agent, or Firm*—Becker & Becker, Inc.

[57] ABSTRACT

A switching mechanism with a vacuum circuit breaker between a bus bar and a cable connection stud. With this switching mechanism, the conductor parts forming the current path are coaxially arranged in an insulating oil bed surrounded by a tightly sealing outer sleeve of electrically conducting material and an inner sleeve of electrically insulating material. That end of the immovable contact of the vacuum circuit breaker which projects from the vacuum container is fastened to the inner conductor of the bus bar or collecting bar and extends transversely therefrom. The movable outer contact of the vacuum circuit breaker connected to the inner conductor of the cable connection stud is actuable axially via an insulating body. The electrically conducting outer sleeve has a rigid cylindrical tube with a branch for the cable connection stud and a T-shaped base part to receive a partial section of the inner conductor of the bus bar; a tubular outer hull piece of the bus bar or an end cover of the bus bar can be flanged to both arm pieces of the T-shaped base part of the cylindrical tube; the insulating oil bed separates the electrically conducting outer sleeve and the electrically insulated inner sleeve from each other; and the inner sleeve is designed as a support structure for the coaxial fixation of the conductor parts forming the current path.

7 Claims, 2 Drawing Figures

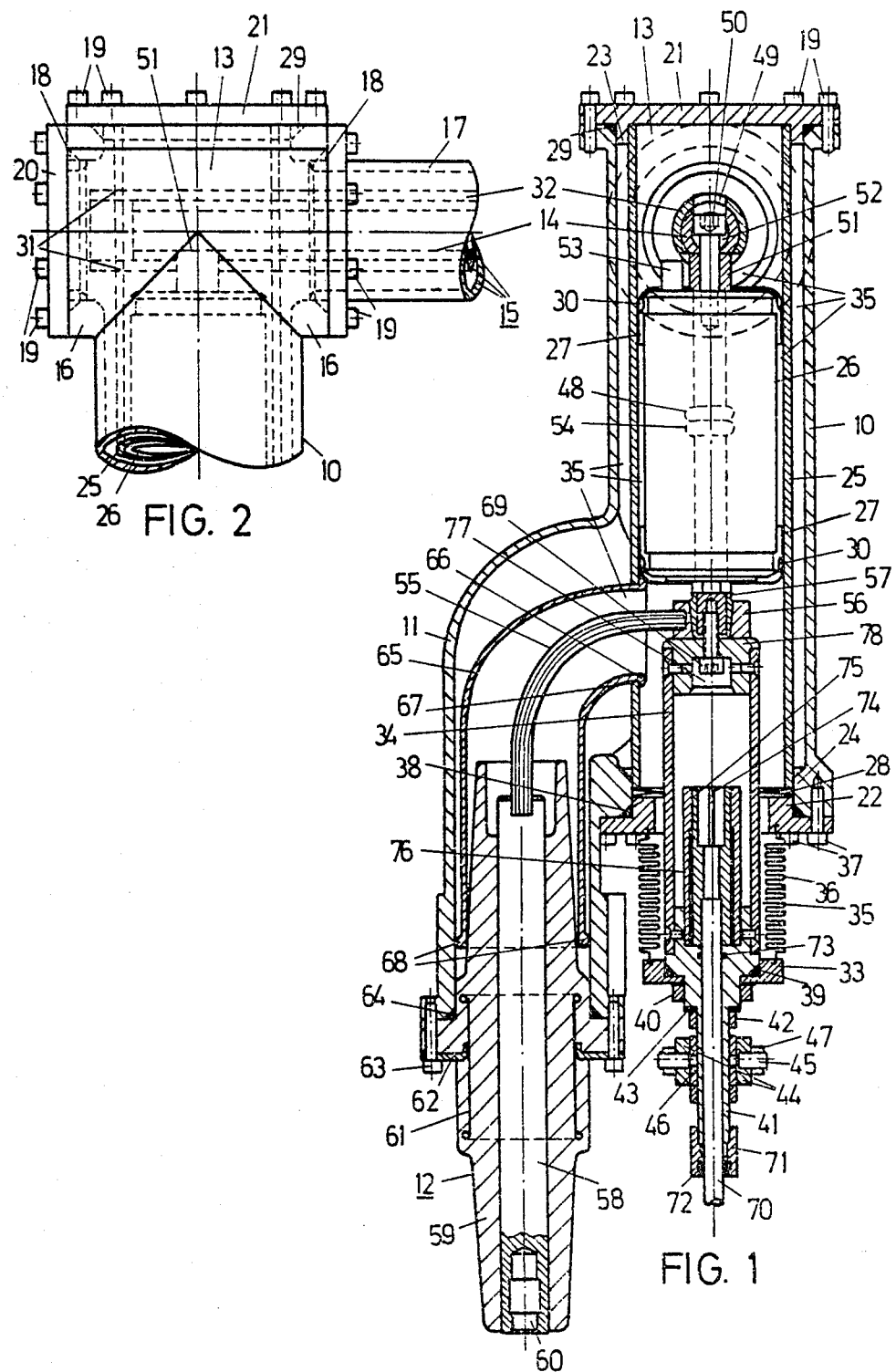

SWITCHING MECHANISM WITH A VACUUM CIRCUIT BREAKER BETWEEN A BUS BAR AND A CABLE CONNECTION PIECE

The present invention relates to a switching mechanism with a vacuum circuit breaker between a bus bar and a cable connection stud. With this switching mechanism, the conductor parts forming the current path are coaxially arranged in an insulating oil bed surrounded by a tightly sealing outer sleeve of electrically conducting material and an inner sleeve of electrically insulating material. That end of the immovable contact of the vacuum circuit breaker which projects from the vacuum container is fastened to the inner conductor of the bus bar or collecting bar and extends transversely therefrom. The movable counter contact of the vacuum circuit breaker connected to the inner conductor of the cable connection stud is actuatable axially via an insulating body.

Such switching mechanisms are utilized mainly in electrical systems which operate in the median voltage range, especially in transformer stations. Potential equalization at ground level is assured, by means of the tightly closing surrounding outer sleeve of electrically conducting material, in all regions of the switching mechanism accessible for contact or engagement. In this way, insulators and protective boxes restricting the installation possibilities of the switching mechanism can be omitted. Each individual switch is incorporated in the electrical conduit to be switched also with three-phase switches encompassing three pole switches, so that the switching mechanism receives a cable character and is especially suited for underground stations where a troublefree operation is required even with flooding or inundation. The utilization of a so-called vacuum circuit breaker or interrupter as a load separation switch between the bus bar and the cable connection stud enables a very compact construction of the switching mechanism, avoids maintenance and service work, and permits any suitable installation position.

German Offenlegungsschrift No. 27 39 811 discloses a switching mechanism of the type under consideration with which a connection stud of the bus bar, the vacuum interrupter or circuit breaker, the cable connection stud, and the insulating body are surrounded by a tightly enclosing electrical insulating sleeve with a bellows consisting of at least one annular enclosing fold taking up the switching movements of the insulating body. The insulating sleeve is designed unitary or as a one-piece unit and is elastic beyond its area serving as a bellows. The insulating sleeve is provided with an electrically conducting outer layer for ground potential over an electrically insulating inner layer, and respectively has a press-fit or force-fit connection with a stud of the bus bar, the cable connection stud and the insulating body. Such a double sleeve is not easy to produce and is accompanied by temporary fluctuations in the strength or thickness of the insulating oil bed. Additional spacers would change the thickness or strength of the insulating oil bed locally and thus would likewise restrict the effectiveness of the insulating oil bed. Additionally, the insulating oil bed experiences an interruption at the connection stud of the bus bar so that an expansion vessel provided at the bus bar is not available also for that portion of the insulating oil bed located in the double sleeve.

It is an object of the present invention to provide a switching mechanism of the type described which permits a space-saving construction with a high safety against Corona discharge or breakthrough (arcing-through) to the outer sleeve, and which is composed of elements which are easy to assemble and easy to seal.

This object, and other objects and advantages of the present invention, will appear more clearly from the following specification in connection with the accompanying drawings, in which:

FIG. 1 shows a longitudinal section through a switching mechanism in accordance with the present invention; and FIG. 2 is a fragmentary view, displaced by a right angle, to show the bus bar transition or junction of this switching mechanism.

The switching mechanism of the present invention is characterized primarily in that the electrically conducting outer sleeve has a rigid cylindrical tube with a branch for the cable connection stud and a T-shaped base part to receive a partial section of the inner conductor of the bus bar; in that a tubular outer hull piece of the bus bar or an end cover of the bus bar can be flanged to both arm pieces of the T-shaped base part of the cylindrical tube; in that the insulating oil bed separates the electrically conducting outer sleeve and the electrically insulated inner sleeve from each other; and in that the inner sleeve is designed as a support structure for the coaxial fixation of the conductor parts forming the current path.

Of the electrically conductive outer sleeve of the inventive switching mechanism, the rigid cylindrical tube with the branch and the T-shaped base portion can be produced as a cast element in a cost advantageous manner. The T-shaped base part of the cylindrical tube allows for an insulating oil bed which is continuous from the cable connection stud as far as into the bus bar with a single expansion container in the region of the bus bar. Advantages attained with the invention are also especially seen therein that the insulating oil bed is placed in a safe layer thickness at all locations between the electrically conducting outer sleeve and the electrically insulating inner sleeve, while receiving a second layer especially in that area of the rigid cylindrical tube provided with the branch and the T-shaped base part; this second layer extends from the electrically insulating inner sleeve as far as to the conductor parts forming the current path, with the exception of the vacuum of the vacuum interrupter or circuit breaker. The subdivision of the insulating oil bed into two layers by means of the electrically insulating inner sleeve more effectively prevents the so-called thread or filament formation which precedes Corona discharges or breakthroughs (penetration) to the electrically conducting outer sleeve of the switching mechanism.

According to specific features of the present invention, the inner sleeve may have a support tube clamped between a bottom cover of the T-shaped base part and a cap or head ring of the cylindrical tube of the outer sleeve; this support tube may be fixed coaxially at both of its ends respectively in a jack or plug-in socket in the outer sleeve; the vacuum container of the vacuum interrupter or circuit breaker may engage internally against the support tube with two centering caps.

The inner conductor of the bus bar may receive its coaxial fixation, relative to the outer sleeve piece flanged to the T-shaped base part of the cylindrical tube of the outer sleeve, from the edge of at least one of the two crossing openings in the support tube carrying therein the vacuum container of the vacuum circuit breaker.

The coaxial fixation of the inner conductor of the bus bar at the edge of the crossing openings may occur indirectly by the interposing of the inner sleeve of the bus bar.

An outer sleeve cap or head may be flanged onto that end of the cylindrical tube of the outer sleeve which is located opposite to the T-shaped base part; the outer sleeve cap may surround the insulating body which transmits the axial switching movements onto the vacuum circuit breaker mechanism and, more particularly, may surround that part thereof which projects from the cylindrical tube in accordance with the respective switching condition, with coaxial metal bellows while leaving a free space for the continuation of the oil bed.

The branch of the cylindrical tube of the outer sleeve may start near that end of the cylindrical tube located opposite from the T-shaped base part, and from there may have a direct elbow-shaped transition into a mounting, which is axis-parallel to the cylindrical tube, for a cast resin body of the cable connection stud containing a conductor passage therethrough.

A ground switch following or taken along in the switching movements of the insulating body may be installed in the insulating body which transmits the axial switching movements to the vacuum circuit breaker, whereby the fixed contact of the ground switch is fastened on the movable contacts of the vacuum circuit breaker mechanism, and the movable counter contact of the ground switch in the form of a ground pin or stud is passed coaxially through an actuating rod of the insulating body.

Referring now to the drawing in detail, with the switching mechanism illustrated in the drawing, the electrically conducting outer sleeve is provided with a rigid cylindrical tube 10, with branch 11 for the cable connection 12, and with a T-shaped base or foot part 13 for receiving a partial section of the inner conductor 14 of the collecting or bus bar 15. As seen in FIG. 2, by means of cylinder screws 19 and while interposing a sealing ring 18, a tubular outer sleeve piece 17 of the bus bar 15 is flanged to one of the two arm pieces 16 of the T-shaped base part 13 of the cylindrical tube 10; and an end cover 20 of the bus bar 15 is flanged to the other of the two arm pieces 16 likewise by means of cylinder screws 19 and while interposing a sealing ring 18. The electrically insulating inner sleeve comprises a support tube 25 clamped between a bottom cover 21 of the T-shaped base part 13 and a head ring 22 of the cylinder tube 10 of the outer sleeve; this support tube 25 is coaxially fixed at both of its ends in a jack or plug-in socket 23 respectively 24 formed in the outer sleeve, while the vacuum container of the vacuum interrupter or circuit breaker 26 with two centering caps 27 engages internally against the support tube 25. The assembly of the switching mechanism is thereby further simplified, and the safety against Corona discharges or breakthroughs to the outer sleeve is further increased with such a space-saving construction.

The support tube 25, as well as all other parts of the electrically insulating inner sleeve of the switching mechanism, is preferably made of hard paper (bakelized paper or laminated paper), because this material harmonizes especially well with the adjoining insulating oil with respect to its electrical characteristics, and because this material, when stacked or layered, has a particularly good natural stability. A dish or cup spring 28 inserted between the head ring 22 and the support tube 25 presses the support tube 25 against the bottom cover 21 which is flanged to the T-shaped base part 13 of the cylindrical tube 10 by further cylinder screws 19 while interposing a sealing ring 29. Both centering caps 27 of the vacuum interrupter or circuit breaker 26 contain latching nubs 30 so that an insulating oil layer can form also under each centering cap 27.

Additional spacer means are rendered superfluous since the inner conductor 14 of the bus bar 15 receives its coaxial fixation, relative to the outer sleeve piece 17 flanged to the T-shaped base part 13 of the cylindrical tube 10 of the outer sleeve, from the edge of at least one of the two crossing openings 31 in the support tube 25 carrying therein the vacuum container of the vacuum circuit breaker 26. Accordingly, the support tube 25 of the inner sleeve is determinative for the coaxial fixation of all conductor parts forming the current paths. Preferably the coaxial fixation of the inner conductor 14 of the bus bar 15 occurs indirectly at the edge of the crossing opening 31 while interposing the inner sleeve 32 of the bus bar 15. This inner sleeve 32 of the bus bar 15 is a hard paper tube (bakelized paper or laminated paper tube) like the support tube 25.

To improve the simple assembly and sealing of the switching mechanism, an outer sleeve head or cap 33 is flanged to that end of the cylindrical tube 10 of the outer sleeve which is located opposite to the T-shaped base part 13. This cap 33 surrounds that section of the insulating body 34 which projects from the cylindrical tube 10 according to the respective switching condition and which transfers the axial switching motions to the vacuum circuit breaker 26. The cap 33 surrounds this section o the body 34 with a coaxial metal bellows 36 while leaving a free space for the continuation of the insulating oil bed 35. The flanging of cap 33, which forms unit with head ring 22, to tube 10 occurs by means of the cylinder screws 37 while interposing a sealing ring 38. A further sealing ring 39 is provided between the outer end of the outer sleeve cap 33 and the outer end of the insulating body 34, these two parts being held together by a nut 40. Directly adjacent thereto, a grounding band or belt 43 is fastened to the actuating rod 41 of the insulating body 34 by another nut 42, this grounding band 43 engaging the entire outer sleeve of the switching mechanism.

An actuating device for opening and closing the vacuum circuit breaker 26 engages the actuating rod 41 somewhat laterally of the nut 42. Of this actuating device, only an actuating fork 44 is visible in FIG. 1; the fork halves of the actuating fork 44 are each provided with a threaded pin 45, a clamping plate 46, and securing nut 47. That switching condition of the switching mechanism is illustrated in which the installed vacuum breaker 26 is closed. Inside the vacuum container of the vacuum circuit breaker 26, the conditions are represented in dash lines in a simplified symbolic manner.

The immovable contact 48 of the vacuum circuit breaker 26 is fastened with its end projecting from the vacuum container on the inner conductor 14 of the bus bar 15. This fastening is effected by a cylinder screw 50 inserted from the bottom cover 21 into a recess 49 of the inner conductor 14 of the bus bar 15 with the interposition of a spacer tube 51 and a screw support or shim 52. Space for the suction connection 53 of the vacuum circuit breaker 26 is available adjacent to the spacer tube 51. The movable counter contact 54 of the vacuum circuit breaker 26, which is axially actuatable by means of the insulating body 34, is connected with the flexible inner conductor 55 of the cable connection 12 through a ring-shaped connection clamp 56 and a clamping sleeve 57.

An especially compact or space-saving type of construction of the switching device is assured thereby that the branch 11 of the cylindrical tube 10 of the outer sleeve starts close to that end of the cylindrical tube 10 which is located across from the T-shaped base part 13. From this point on, the branch 11 is extended outwardly in an elbow or knee shape to form a mounting or socket holder, which is axis parallel to the cylindrical tube 10, for a cast resin body 59 of the cable connection 12, the body 59 containing a conductor passage 58 therethrough. This type of construction allows that several units of the described switching mechanism or device can be arranged very close adjacent to each other, for instance in a transformer station. There is to be noted that rather bulky spark plugs are placed on the cable connection studs 12. For receiving the plug contact, a cylindrical bore 60 is provided at the outer end of the conductor passage 58 designed as a copper bolt or threaded shoulder pin. The flexible inner conductor 55 of the cable connection stud 12 is anchored at the other end of the conductor passage 58. A coaxial shielding grid or screen 61 is embedded in the cast resin body 59, and this grid 61 is grounded via a metal flange 62 of the cast resin body 59 and the fastening screws 63 of the branch 11 of the cylindrical tube 10. A sealing ring 64 interposed at the end of the branch 11 prevents leakage of insulating oil from the insulating oil bed 35 reaching from between the cast resin body 59 and the branch 11 to close to the metal flange 62.

In the region of the branch 11 of the cylindrical tube 10, the insulating oil bed 35 is likewise divided into two layers by the electrically insulating inner sleeve of the switching mechanism, and this is done by a pipe elbow or knee 65 of hard paper (bakelized paper or laminated paper) which in its interior leaves sufficient space for the flexible inner conductor 55 of the cable connection stud 12 to carry out the switching movements. The pipe elbow 65 is hung with an end bead 66 in a window 67 of the support tube 25, and with its other end engages over the there conically shaped cast resin body 59. An essentially equally thick outer layer of the insulating oil bed 35 is assured by the support nubs 68 of the pipe elbow 65 directed against the branch 11.

For the purpose of saving space combined with a high safety of the switching mechanism, finally a ground switch, capable of being taken along in the switching movements of the body 34, is installed in the insulating body 34 which transfers the axial switching movements of the vacuum interrupter or circuit breaker 26. The fixed contact 69 of the ground switch is fastened on the movable contact 54 of the vacuum circuit breaker 26, and the movable counter contact of the ground switch is passed coaxially through the actuating rod 41 of the insulating body 34 in the shape of ground bolt or stud 70. The ground switch 69, 70 serves primarily to shunt or ground electrical residual charges of the conductor parts disengaged from contact with the bus bar 15 by the vacuum circuit breaker 26, before the cable plug (not illustrated in the drawing) is withdrawn from the cable connection stud 12. Provision is made that the insulating oil bed 35 of the switching mechanism continues into the hollow insulating body 34. A cap nut 71 with an internally located ring or annular seal 72 relative to the ground stud 70 is provided at the outer end of the actuating rod 41. A wiper ring 73 surrounds the ground stud 70 ahead of nut 71. Furthermore, the ground stud 70 has a cap or head piece 75, provided with spring slots 74, which is guided in an inner sleeve 76 of the insulating body 34 and enters into a central depression 77 in the inserted front end 78 of the insulating body 34. The fixed contact 69 of the ground switch 69, 70, secured on the movable counter contact 54 of the vacuum circuit breaker mechanism 26, consists of a cylindrical screw the head of which disappears in the central depression 77. The screw is resiliently surrounded by the cap or head piece 75 of the ground stud 70, and simultaneously secures the hollow insulating body 34 from the inside on the movable counter contact 54 of the vacuum circuit breaker mechanism 26.

The present invention is, of course, in no way restricted to the specific disclosure of the specification and drawings, but also encompasses any modifications within the scope of the appended claims.

What we claim is:

1. A switching mechanism, comprising:

a bus bar having an inner conductor and a tubular outer sleeve piece;

a cable connection having an inner conductor;

a vacuum circuit breaker having a vacuum container and being arranged between said bus bar and said cable connection; said vacuum circuit breaker having an immovable contact having an end projecting from said vacuum container and fastened transversely to said inner conductor of said bus bar; said vacuum circuit breaker also having a movable counter contact connected to said inner conductor of said cable connection;

an insulating body associated with said counter contact for axially actuating same;

an electrically conductive outer sleeve which includes a rigid cylindrical tube having at one end a branch for receiving said cable connection, and at the other end a T-shaped base part for receiving a portion of said inner conductor of said bus bar; said tubular outer sleeve of said bus bar being flanged to one arm of said T-shaped base part, and an end cover being flanged to the other arm of said base part;

an electrically insulated inner sleeve which forms a support structure for coaxial fixation of those conductor parts which form the current path, namely said inner conductor of said bus bar, said immovable contact of said vacuum circuit breaker, and said movable counter contact thereof; and an insulating oil bed for said conductor parts which form the current path, said insulating oil bed separating said electrically conductive outer sleeve and said electrically insulated inner sleeve from each other.

2. A switching mechanism according to claim 1, in which said electrically insulated inner sleeve includes a support tube clamped between a base cover of said T-shaped base part and a head ring of said cylindrical tue remote from said base part; opposite ends of said cylindrical tube being provided with respective sockets for respectively coaxilly fixing said support tube in said cylindrical tube; said vacuum container of said vacuum circuit breaker being arranged in said support tube and being provided with two centering caps for engaging the inside of said support tube.

3. A switching mechanism according to claim 2, in which said support tube is provided with two crossing openings in the vicinity of said T-shaped base part, and in which said inner conductor of said bus bar receives a coaxial fixation relative to said tubular outer sleeve piece of said bus bar from the edge of at least one of said crossing openings.

4. A switching mechanism according to claim 3, in which said bus bar includes an inner sleeve, which forms a part of said electrically insulated inner sleeve, said coaxial fixation of said inner conductor of said bus bar being effected via the interposition of said inner sleeve of said bus bar.

5. A switching mechanism according to claim 2, which includes an outer sleeve cap flanged onto that end of said cylindrical tube remote from said T-shaped base part via the interposition of a coaxial metal bellows; with said outer sleeve cap and said metal bellows surrounding that portion of said insulating body which, depending upon the switching condition, projects from said cylindrical tube, said metal bellows being spaced from said insulating body so as to leave an intermediate space for the continuation of said insulating oil bed.

6. A switching mechanism according to claim 5, in which said branch of said electrically conductive outer sleeve starts at that end of said cylindrical tube remote from said T-shaped base part and continues directly via an elbow-shaped transition into a mounting which is axis-parallel to said cylindrical tube; and in which said cable connection includes a casting resin body having a conductor passage therethrough, said mounting of said branch receiving said casting resin body.

7. A switching mechanism according to claim 6, which includes a grounding switch installed in said insulating body and taken along in the switching movements of said insulating body as the latter transmits axial switching movements to said vacuum circuit breaker; said grounding switch having a fixed contact fastened to said movable counter contact of said vacuum circuit breaker; and in which said insulating body has an actuating rod; said grounding switch also having a movable counter contact in the form of a grounding stud, said grounding stud being passed coaxially through said actuating rod.

* * * * *